C. R. SPRAGUE.
SAW STRETCHING MACHINE ATTACHMENT.
APPLICATION FILED AUG. 27, 1912.

1,054,367.

Patented Feb. 25, 1913.

2 SHEETS—SHEET 1.

Witnesses

Inventor
C. R. Sprague
By C. L. Parker
Attorney

C. R. SPRAGUE.
SAW STRETCHING MACHINE ATTACHMENT.
APPLICATION FILED AUG. 27, 1912.
1,054,367.
Patented Feb. 25, 1913.
2 SHEETS—SHEET 2.
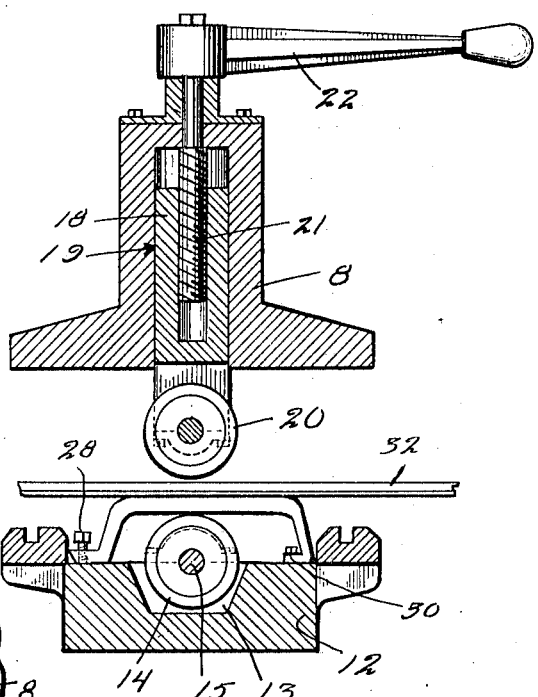
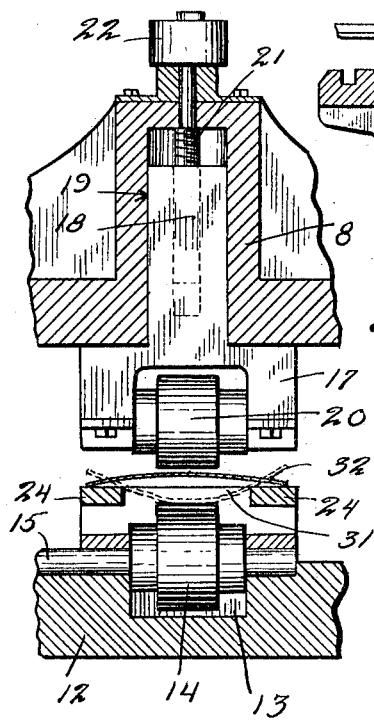
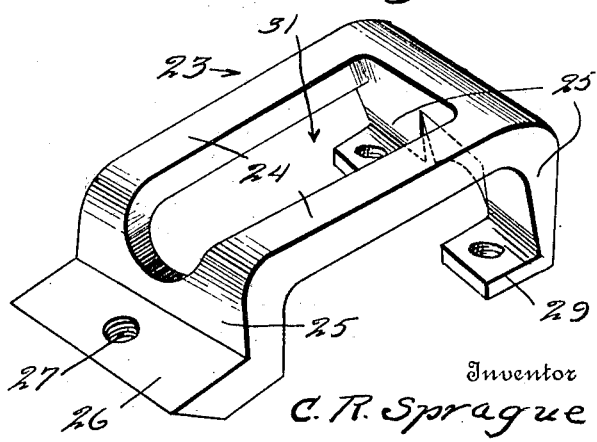
Inventor
C. R. Sprague

UNITED STATES PATENT OFFICE.

CLARE R. SPRAGUE, OF VERDI, NEVADA.

SAW-STRETCHING-MACHINE ATTACHMENT.

1,054,367.  Specification of Letters Patent.  Patented Feb. 25, 1913.

Application filed August 27, 1912. Serial No. 717,289.

*To all whom it may concern:*

Be it known that I, CLARE R. SPRAGUE, a citizen of the United States, residing at Verdi, in the county of Washoe and State of Nevada, have invented certain new and useful Improvements in Saw-Stretching-Machine Attachments, of which the following is a specification.

My invention relates to new and useful improvements in machines for stretching band saws, and has particular reference to an attachment to be used in connection with such machines for taking the dish or transverse curve or warp out of such band saws while they are being stretched.

An important object of my invention is to provide an attachment of the above mentioned character, which may be secured to a band saw stretching machine without materially altering its construction.

A further object of the invention is to provide a device of the above mentioned character, which is simple in construction, cheap to manufacture, and durable.

Other objects and advantages of the invention will be apparent during the course of the following description.

Figure 1:
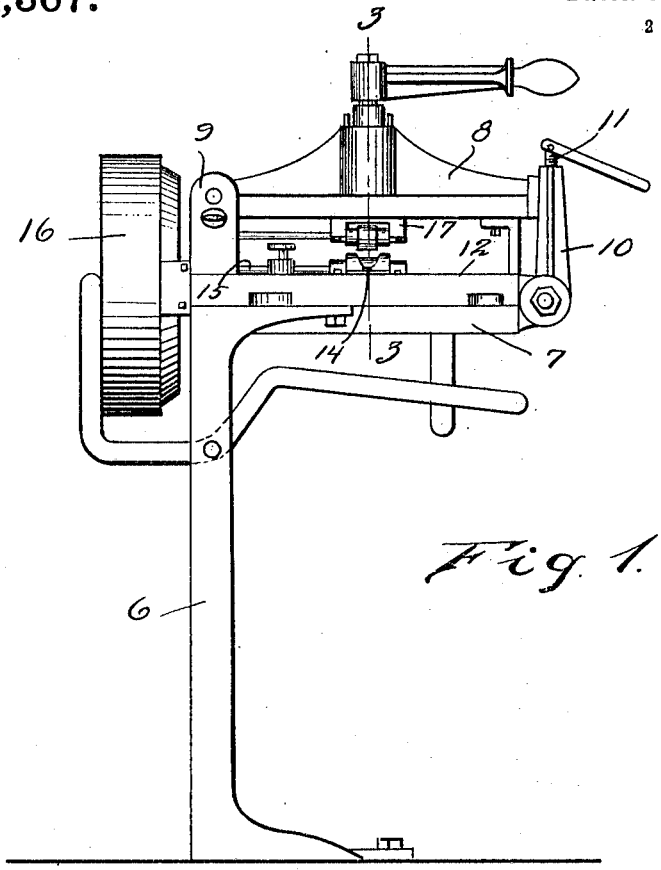
Figure 2:
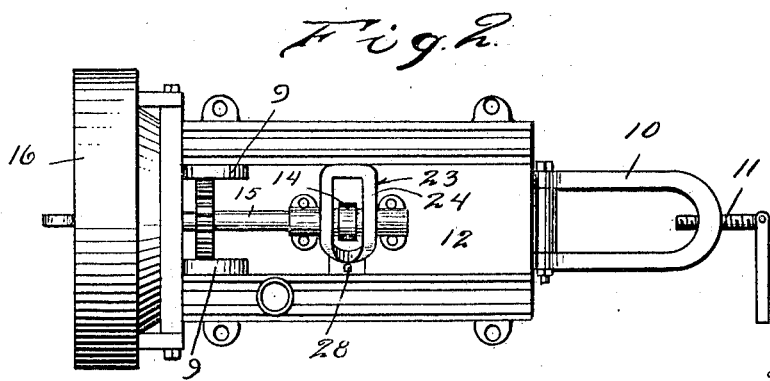

In the accompanying drawings forming a part of this specification and in which like numerals are employed to designate like parts throughout the same, Figure 1 is a side view of a band saw stretching machine, showing my attachment applied thereto, Fig. 2 is a plan view of the same, the upper cross piece being omitted, Fig. 3 is a transverse vertical sectional view taken on line 3—3 of Fig. 1, Fig. 4 is a central vertical longitudinal sectional view taken through the machine, parts being broken away, and, Fig. 5 is a perspective view of my attachment.

In the drawings wherein for the purpose of illustration, I have shown a preferred embodiment of my invention, the numeral 6 designates a pedestal upon which is mounted a horizontal support 7.

The numeral 8 designates a swinging transverse piece or head, pivotally connected at one end with upstanding brackets 9.

Pivotally connected with the support 7 is a swinging latch 10, adapted to receive one end of the transverse piece 8 and provided with clamping means 11 to engage the same.

Suitably mounted upon the support 7 is a base 12, provided with a recess 13, as shown in Fig. 4, for receiving a lower roller 14, which is driven by a shaft 15. This shaft receives its rotation from a pulley 16 or the like.

Disposed above the lower roller 14 is a vertically adjustable forked bearing 17, carrying a shank 18, which is mounted to reciprocate within a socket 19 formed in the transverse piece or head 8, as shown. The forked bearing 17 carries an upper roller 20, adapted to be moved into and out of engagement with the roller 14. The vertical movement of the bearing 17 is effected by a screw 21, having engagement with the shank 18. Rigidly connected with this screw is a handle 22. It is thus seen that by turning the handle 22 the bearing 17 will be raised and lowered.

It is thought that the above description of the machine should suffice as no claim is made to the same *per se*.

My invention particularly resides in the provision of an attachment 23, which is placed over and about the lower roller 14. This attachment comprises an upper horizontal flat body portion 24, supported by end pieces or legs 25, as shown. One of these legs is provided at its lower end with a horizontal extension 26, having a screw-threaded opening 27 formed therethrough to receive an adjusting bolt 28. The other legs 25 have apertured ears or extensions 29 formed thereon, for receiving screws or bolts 30, which serve to pivotally connect this end of the attachment to the base 12, holding the same from displacement and allowing the opposite end of the device to be raised and lowered by proper manipulation of the bolt 28, it being understood that the bolt 28 has no screw-threaded engagement with the base 12 but simply has its free end bearing against the same. The horizontal body portion 24 is provided with an opening 31 formed therethrough and extending longitudinally of the same. This opening also extends through a portion of the legs 25 which are adjacent the horizontal extension 26, as shown. As clearly shown in Figs. 1, 2 and 4, the attachment 23 is placed over and about the lower roller 14 and is parallel to the plane of rotation of said roller. The body portion 24 of the attachment is suitably spaced from the lower roller and the distance between the same and said roller may be varied by manipulation of the bolt 28, depending upon the degree of dish or transverse curve which the saw has.

The operation of the device is as follows:—A band saw 32 is placed upon the attachment 23, as shown in Fig. 4. These band saws ordinarily acquire, when in use, an outward curve or dish, as shown in Fig. 4. The handle 22 is now turned to bring the upper roller 20 down into engagement with the band saw 32, which band saw is in turn brought into engagement with the lower roller 14. The proper degree of pressure being obtained between the two rollers and the band saw, said band saw will be slowly fed between said rollers, since the lower roller 14 is slowly rotated by the shaft 15. The rollers 14 and 20 stretch the saw, as is well known, and my attachment will at the same time take out the transverse curve or dish. The dotted lines in Fig. 4 show the position assumed by the saw when the two rollers are in engagement therewith.

It is to be understood that the form of my invention herewith shown and described is to be taken as a preferred example of the same and that certain changes in the shape, size, and arrangement of parts may be resorted to without departing from the spirit of the invention as defined by the subjoined claims.

Having thus described my invention, I claim:—

1. The combination with a band saw stretching machine, comprising a supporting structure, a roller, a second co-acting roller, and means to move the second roller toward and away from the first named roller, of a device to be placed about the first named roller to hold portions of the band saw spaced from said first named roller and having an opening formed therein for the passage of the second roller, whereby the central portion of the band saw may be forced downwardly through the opening into engagement with the first named roller.

2. The combination with a machine, comprising a supporting structure, a lower roller, an upper roller, and means to vertically move the upper roller, of an attachment to be disposed adjacent the lower roller, comprising an upper body portion provided with an opening, and means to hold said body portion at a suitably spaced distance above the lower roller.

3. The combination with a machine, comprising a supporting structure, a lower roller, an upper roller, and means to vertically move the upper roller, of an attachment to be disposed adjacent the lower roller, comprising an upper body portion provided with an opening, and adjustable means to hold the body portion in adjustment at different spaced distances above the lower roller.

4. In means of the character described, the combination with a roller, of a device to be mounted near the roller and adapted to retain the longitudinal edges of a saw spaced from the roller and permit the central longitudinal portion of the saw to be moved into engagement with the roller whereby the saw will be transversely curved, and means to move the central portion of the saw into engagement with the roller.

5. As an article of manufacture, an attachment to be disposed in coöperative relation with the roller of a band saw stretching machine, comprising an inverted approximately U-shaped frame having a horizontal body portion to be disposed at a suitable distance above the roller and provided with a large opening formed therethrough, said horizontal body portion adapted to normally hold the band saw spaced from the roller and cause the same to be transversely curved when forced into engagement with the roller.

In testimony whereof I affix my signature in presence of two witnesses.

CLARE R. SPRAGUE.

Witnesses:
F. E. WALKER,
O. W. BRYAN.

Copies of this patent may be obtained for five cents each, by addressing the "Commissioner of Patents, Washington, D. C."